(12) United States Patent
Fujino et al.

(10) Patent No.: US 11,553,421 B2
(45) Date of Patent: Jan. 10, 2023

(54) WIRELESS COMMUNICATION SYSTEM, FIRST WIRELESS APPARATUS, SECOND WIRELESS APPARATUS AND WIRELESS COMMUNICATION METHOD

(71) Applicant: Nippon Telegraph and Telephone Corporation, Tokyo (JP)

(72) Inventors: Yosuke Fujino, Tokyo (JP); Shigeru Teruhi, Tokyo (JP); Kazunori Akabane, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 140 days.

(21) Appl. No.: 17/254,999

(22) PCT Filed: Jun. 5, 2019

(86) PCT No.: PCT/JP2019/022332
§ 371 (c)(1),
(2) Date: Dec. 22, 2020

(87) PCT Pub. No.: WO2020/003937
PCT Pub. Date: Jan. 2, 2020

(65) Prior Publication Data
US 2021/0266832 A1 Aug. 26, 2021

(30) Foreign Application Priority Data
Jun. 27, 2018 (JP) ............................. JP2018-122325

(51) Int. Cl.
*H04W 52/02* (2009.01)
*H04W 76/28* (2018.01)
(Continued)

(52) U.S. Cl.
CPC ... *H04W 52/0216* (2013.01); *H04W 52/0229* (2013.01); *H04W 76/28* (2018.02)

(58) Field of Classification Search
CPC ......... H04W 52/0216; H04W 52/0229; H04W 76/28; H04W 84/18; H04W 4/38;
(Continued)

(56) References Cited

U.S. PATENT DOCUMENTS

| 8,232,868 | B2 * | 7/2012 | Steeves | G06K 7/10108 340/425.1 |
| 8,370,697 | B2 * | 2/2013 | Veillette | G01D 4/004 714/748 |

(Continued)

FOREIGN PATENT DOCUMENTS

| BR | 102014019159 A2 * | 9/2015 | ......... G06K 7/10128 |
| JP | H06-201821 | 7/1994 | |

(Continued)

OTHER PUBLICATIONS

El-Hoiydi, "Aloha with Preamble Sampling for Sporadic Traffic in Ad Hoc Wireless Sensor Networks," Proc. of IEEE ICC, Apr. 28, 2002, pp. 3418-3423.

*Primary Examiner* — Inder P Mehra
(74) *Attorney, Agent, or Firm* — Fish & Richardson P.C.

(57) ABSTRACT

Provided is a wireless communication system in which a first wireless device and a second wireless device intermittently perform wireless communication, in which the first wireless device repeatedly transmits an activation signal for activating the second wireless device at a first cycle until receiving a response signal from the second wireless device, the second wireless device repeatedly executes detection processing of the activation signal at a second cycle that is longer than the first cycle, receives, when a part of the activation signal is detected in the detection processing, the activation signal, transmits, when the activation signal is addressed to the second wireless device itself, the response signal to the first wireless device, the first wireless device transmits, when the response signal is received, data to the (Continued)

second wireless device, and the second wireless device receives, after transmitting the response signal, the data from the first wireless device.

12 Claims, 7 Drawing Sheets

(51) Int. Cl.
    *H04W 84/18*     (2009.01)
    *H04W 4/38*     (2018.01)
    *H04W 28/06*     (2009.01)
    *H04W 74/06*     (2009.01)
    *H04W 74/08*     (2009.01)
    *H04W 76/14*     (2018.01)

(58) Field of Classification Search
    CPC ..... H04W 28/06; H04W 52/02; H04W 74/06; H04W 74/08; H04W 76/14; Y02D 30/70
    USPC .......................................................... 370/318
    See application file for complete search history.

(56) References Cited

U.S. PATENT DOCUMENTS

| | | | |
|---|---|---|---|
| 2004/0039951 A1* | 2/2004 | Naitou | H04W 52/028 713/300 |
| 2015/0063473 A1* | 3/2015 | Nishibayashi | H02J 3/32 375/257 |
| 2015/0358778 A1* | 12/2015 | Heo | H04W 4/027 455/456.6 |
| 2018/0278726 A1* | 9/2018 | Kyou | H04L 69/22 |

FOREIGN PATENT DOCUMENTS

| | | | |
|---|---|---|---|
| JP | 2009-177243 | 8/2009 | |
| JP | 2009-219083 | 9/2009 | |
| JP | 2013-5419 | 1/2013 | |
| JP | 6126499 B2 * | 5/2017 | H02J 13/00 |

* cited by examiner

WIRELESS COMMUNICATION SYSTEM, FIRST WIRELESS APPARATUS, SECOND WIRELESS APPARATUS AND WIRELESS COMMUNICATION METHOD

CROSS-REFERENCE TO RELATED APPLICATIONS

This application is a National Stage application under 35 U.S.C. § 371 of International Application No. PCT/JP2019/022332, having an International Filing Date of Jun. 5, 2019, which claims priority to Japanese Application Serial No. 2018-122325, filed on Jun. 27, 2018. The disclosure of the prior application is considered part of the disclosure of this application, and is incorporated in its entirety into this application.

TECHNICAL FIELD

The present disclosure relates to a technology for performing wireless communication through intermittent operations.

BACKGROUND ART

With the development of the Internet of Things (IoT), devices such as sensors having wireless communication functions have been placed at various locations to perform collection of information. Devices are placed for collecting information even at locations where power sources are not secured. Such devices need to be driven by batteries for long periods of time in units of years. Thus, it is necessary for them to save power while operating.

In the related art, power saving has been achieved by intermittently performing communication and sleeping as long as possible except for times when communication is needed. In a case in which it is necessary to wait for irregularly transmitted data, in particular, a power saving technology for determining the presence of transmitted data through intermittent operations is needed. With regard to this power saving technology, it is possible to obtain a higher power saving effect by extending cycles of intermittent determination operations and shortening a time required for one determination operation.

As a technology for obtaining such a high power saving effect, preamble sampling as disclosed in Non Patent Literature 1 has been proposed. FIG. 8 is a time chart illustrating an operation example of wireless communication performed between a first wireless device 80 and a second wireless device 90 described in Non Patent Literature 1. In FIG. 8, the first wireless device 80 transmits data while the second wireless device 90 receives the data. According to this technology, the second wireless device 90 waits for a preamble transmitted from the first wireless device 80 by intermittently performing preamble detection at a predetermined cycle (preamble detection cycle). The first wireless device 80 transmits a preamble for a time longer than the preamble detection cycle of the second wireless device 90 immediately before the transmission of data. Through such transmission of a preamble, the first wireless device 80 reliably performs data communication with the second wireless device 90 that performs intermittent operations.

Note that the preamble detection is detection of a specific pattern unlike electric field intensity measurement and the like. There is thus an advantage that it is possible to perform detection with high precision even in an environment where noise is present or an environment where signals are buried in noise. Such an advantage enables application of this technology to a power saving wireless communication system in a Low Power Wide Area (LPWA) that is often used in harsh environments.

CITATION LIST

Non Patent Literature

Non Patent Literature 1. Amre El-Hoiydi, "Aloha with Preamble Sampling for SporadicTraffic in Ad Hoc Wireless Sensor Networks", Proc. of IEEE ICC 2002, p. 3418 to 3423

SUMMARY OF THE INVENTION

Technical Problem

However, the length of a wireless packet that can be transmitted at one time is generally limited by restriction in implementation of wireless devices and the radio law. According to the technology disclosed in Non Patent Literature 1, there is a need to transmit a preamble for a longer time than the preamble detection cycle. These restrictions make it difficult to extend the preamble detection cycle, and as a result, it is difficult to reduce power consumption.

In view of the aforementioned circumstances, an object of the present disclosure is to provide a technology that enables further reduction of power consumption in a wireless communication device that performs intermittent operations.

Means for Solving the Problem

According to an aspect of the present disclosure, there is provided a wireless communication system in which a first wireless device and a second wireless device intermittently perform wireless communication, in which the first wireless device repeatedly transmits an activation signal for activating the second wireless device at a first cycle until receiving a response signal from the second wireless device, and transmits, when the response signal is received, data to the second wireless device, and the second wireless device repeatedly executes detection processing of the activation signal at a second cycle that is longer than the first cycle, receives, when a part of the activation signal is detected in the detection processing, the activation signal, transmits, when the activation signal is addressed to the second wireless device itself, the response signal to the first wireless device, and then receives the data from the first wireless device.

According to an aspect of the present disclosure, when the second cycle is represented as Trx and two mutually prime integers are represented as M and N, the first wireless device adds a preamble with a length of equal to or longer than 1/N times the length of Trx to the activation signal, and the first cycle is a value of M/N times the value of Trx, in the aforementioned wireless communication system.

According to an aspect of the present disclosure, the first wireless device waits for the response signal over a predetermined time after transmitting the activation signal, in the aforementioned wireless communication system.

According to an aspect of the present disclosure, the first wireless device waits for the response signal over a predetermined time after transmitting the activation signal a plurality of times, in the aforementioned wireless communication system.

According to an aspect of the present disclosure, the second wireless device transmits, when transmitting the response signal, the response signal at a random timing within a predetermined time during which the first wireless device waits for the response signal, in the aforementioned wireless communication system.

According to an aspect of the present disclosure, there is provided a first wireless device in a wireless communication system in which the first wireless device and a second wireless device intermittently perform wireless communication, the first wireless device including a communication control unit configured to repeatedly transmit an activation signal for activating the second wireless device at a first cycle until receiving a response signal from the second wireless device, and transmit, when the response signal is received, data to the second wireless device.

According to an aspect of the present disclosure, there is provided a second wireless device in a wireless communication system in which a first wireless device and the second wireless device intermittently perform wireless communication, in which the first wireless device repeatedly transmits an activation signal for activating the second wireless device at a first cycle until receiving a response signal from the second wireless device, and transmits, when the response signal is received, data to the second wireless device, and the second wireless device includes a communication control unit configured to repeatedly execute detection processing of the activation signal at a second cycle that is longer than the first cycle, receive, when a part of the activation signal is detected in the detection processing, the activation signal, transmit, when the activation signal is addressed to the second wireless device itself, the response signal to the first wireless device, and then receive the data from the first wireless device.

According to an aspect of the present disclosure, there is provided a method of wireless communication performed by a wireless communication system in which a first wireless device and a second wireless device intermittently perform wireless communication, the method including by the first wireless device, repeatedly transmitting an activation signal for activating the second wireless device at a first cycle until receiving a response signal from the second wireless device, by the second wireless device, repeatedly executing detection processing of the activation signal at a second cycle that is longer than the first cycle, receiving, when a part of the activation signal is detected in the detection processing, the activation signal, and transmitting, when the activation signal is addressed to the second wireless device itself, the response signal to the first wireless device, by the first wireless device, transmitting, when the response signal is received, data to the second wireless device, and by the second wireless device, receiving, after transmitting the response signal, the data from the first wireless device.

Effects of the Invention

According to the present disclosure, it is possible to further reduce power consumption in a wireless communication device that performs intermittent operations.

DESCRIPTION OF EMBODIMENTS

Figure 1:
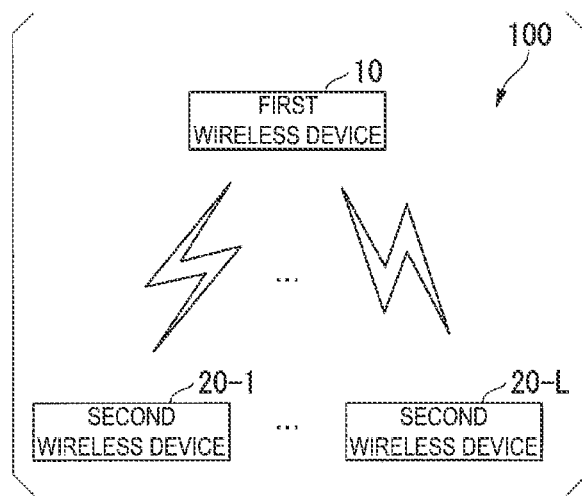
FIG. 1 is a diagram illustrating a system configuration example of a wireless communication system.

Hereinafter, an embodiment according to the present disclosure will be described. FIG. 1 is a diagram illustrating a system configuration example of a wireless communication system. A wireless communication system 100 includes a first wireless device 10 and a plurality of second wireless devices 20 (20-1 to 20-L). The first wireless device 10 and the second wireless devices 20 intermittently perform wireless communication. Details of operations in wireless communication will be described below.

Figure 2:
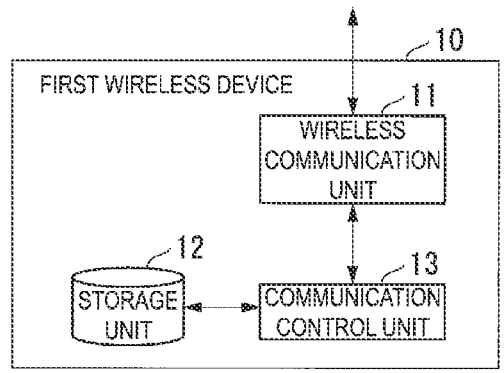
FIG. 2 is a schematic block diagram illustrating a functional configuration of a first wireless device 10.

FIG. 2 is a schematic block diagram illustrating a functional configuration of the first wireless device 10. The first wireless device 10 includes a wireless communication unit 11, a storage unit 12, and a communication control unit 13. The wireless communication unit 11, the storage unit 12, and the communication control unit 13 are connected to each other via a bus.

The wireless communication unit 11 performs wireless communication with the second wireless devices 20 by transmitting and receiving radio waves by a predetermined wireless communication scheme. The wireless communication unit 11 is controlled by the communication control unit 13.

The storage unit 12 is configured using a storage device such as a magnetic storage device or a semiconductor storage device. The storage unit 12 may store information indicating operations of the first wireless device 10. For example, the storage unit 12 may store information indicating an activation signal to be transmitted by the wireless communication unit 11. Specific examples of the information indicating the activation signal include information indicating data included in the activation signal. More specific examples of the information indicating the activation signal include information indicating a signal pattern of a preamble. The storage unit 12 may store activation timing information indicating a timing at which the activation signal is to be transmitted. Specific examples of the activation timing information include information indicating a cycle at which the activation signal is transmitted.

The communication control unit 13 controls operations of the wireless communication unit 11. The communication control unit 13 controls the wireless communication unit 11 to transmit the activation signal at a predefined timing. The information indicating the signal pattern of the activation signal and the transmitting timing of the activation signal may be stored in the storage unit 12 or may be defined in advance by the communication control unit 13. A preamble that is a signal with a predetermined pattern is included in the activation signal. The preamble is generated such that a predetermined pattern can continuously be transmitted over a predetermined period (preamble length). The communication control unit 13 adds the generated preamble to the activation signal.

All or some of functions of the communication control unit 13 may be implemented using hardware such as an Application Specific Integrated Circuit (ASIC), a Programmable Logic Device (PLD), or a Field Programmable Gate Array (FPGA). The communication control unit 13 is configured using a processor such as a Central Processing Unit (CPU). The communication control unit 13 may function by the processor reading and executing a control program stored in the storage unit 12. The control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The control program may be transmitted via an electrical communication line.

Figure 3:
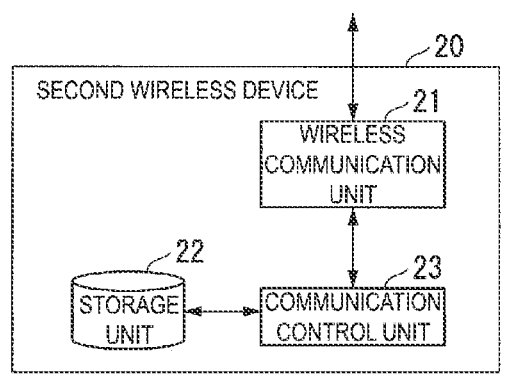
FIG. 3 is a schematic block diagram illustrating a functional configuration of a second wireless device 20.

FIG. 3 is a schematic block diagram illustrating a functional configuration of the second wireless device 20. The second wireless device 20 includes a wireless communication unit 21, a storage unit 22, and a communication control unit 23. The wireless communication unit 21, the storage unit 22, and the communication control unit 23 are connected to each other via a bus.

The wireless communication unit 21 performs wireless communication with the first wireless device 10 by transmitting and receiving radio waves by a predetermined wireless communication scheme. The wireless communication unit 21 waits for reception of the activation signal at a predefined timing (intermittent cycle) by being controlled by the communication control unit 23.

The storage unit 22 is configured using a storage device such as a magnetic storage device or a semiconductor storage device. The storage unit 22 stores information indicating operations of the second wireless device 20. For example, the storage unit 22 stores information indicating the length of the intermittent cycle at which the wireless communication unit 21 waits for reception of the activation signal.

The communication control unit 23 controls operations of the wireless communication unit 21. The communication control unit 23 waits for the activation signal at a predefined timing. The information indicating the length of the intermittent cycle at which the communication control unit 23 waits for reception of the activation signal may be stored in the storage unit 22 or may be defined in advance by the communication control unit 23. Once the activation signal is received, the communication control unit 23 transmits a response signal to the first wireless device 10.

All or some of functions of the communication control unit 23 may be implemented using hardware such as an ASIC, a PLD, or an FPGA The communication control unit 23 is configured using a processor such as a CPU. The communication control unit 23 may function by the processor reading and executing a control program stored in the storage unit 22. The control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The control program may be transmitted via an electrical communication line.

Next, three patterns of specific examples, namely first to third embodiments of operations of the wireless communication system 100 will be described.

First Embodiment

Figure 4:
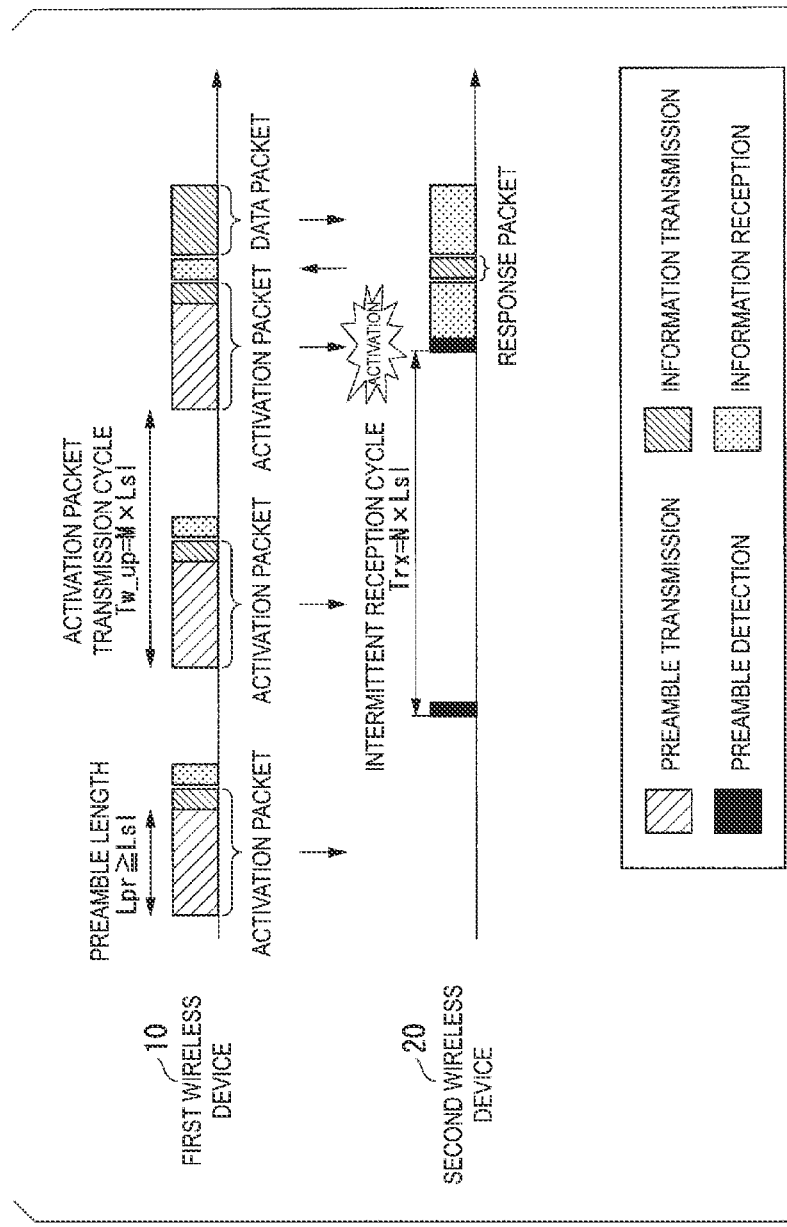
FIG. 4 is a diagram illustrating a specific example of wireless communication performed between the first wireless device 10 and the second wireless device 20 according to a first embodiment.

FIG. 4 is a diagram illustrating a specific example of wireless communication performed between a first wireless device 10 and a second wireless device 20 according to the first embodiment. In the first embodiment, the first wireless device 10 activates the second wireless device 20 configured to intermittently operate and then transmits data to the second wireless device 20. Hereinafter, a processing flow of wireless communication processing in the first embodiment will be described using FIG. 4. Note that values are defined as follows in the following description.

Lpr: Preamble length (time)
Lsl: Unit slot length (time)
Tw_up: Activation signal transmission cycle (time: first cycle)
Trx: Intermittent cycle (time: second cycle)
M, N: Mutually prime integers
L: Number of second wireless devices 20
j: Offset Also, an activation packet will be used as a specific example of the activation signal, and a response packet will be used as a specific example of the response signal, in the following description.

First, a communication control unit 13 of the first wireless device 10 generates an activation packet to which a preamble with a length Lpr has been added. The length Lpr of the preamble is a length that is equal to or longer than a unit slot length Lsl. The length Lpr of the preamble is a length that is equal to or longer than 1/N times the length of Trx, for example. The communication control unit 13 transmits the generated activation packet at an activation signal transmission cycle Tw_up. The length of Tw_up is M×Lsl. In other words, the length of Tw_up is a length of M/N times the length of Trx. Once the activation packet is transmitted, the communication control unit 13 then waits for a response packet over a predetermined time. The response packet is a packet transmitted by the second wireless device 20 that has received the activation packet and has been activated. In a case in which the response packet is not received while the response packet is waited for, the communication control unit 13 repeatedly transmits the activation packet in accordance with the activation signal transmission cycle Tw_up. Note that the information indicating the timing at which the first wireless device 10 waits for the response packet may be included in the activation packet and may be provided as a notification to the second wireless device 20. The information indicating the timing at which the first wireless device 10 waits for the response packet may be stored or set in advance by the second wireless device 20.

A communication control unit 23 of the second wireless device 20 executes preamble detection processing at an intermittent cycle Trx. The length of Trx is N×Lsl. If the preamble is being transmitted from the first wireless device 10 at the timing of the preamble detection processing, the communication control unit 23 detects the preamble. Once the preamble is detected, the communication control unit 23 activates the second wireless device 20 and continues reception processing until a predetermined timing. The predetermined timing may be, for example, a timing until reception of the activation packet is completed or during a predefined time.

Thereafter, the communication control unit 23 of the second wireless device 20 determines whether the received activation packet is addressed to the second wireless device 20 itself. The communication control unit 23 may determine that the activation packet is addressed to the second wireless device 20 itself in a case in which the activation packet has been broadcast as well. In a case in which the received activation packet is addressed to the second wireless device 20 itself, the communication control unit 23 transmits the response packet to the first wireless device 10.

Once the response packet is received, the communication control unit 13 of the first wireless device 10 transmits a data packet to the second wireless device 20. At this time, the communication control unit 13 may temporarily stop the transmission of the activation packet after receiving the response packet. Note that any information may be included in the activation packet as long as the preamble is included therein. However, it is desirable that information indicating a destination be included in the activation packet. The communication control unit 23 of the second wireless device 20 may determine whether the activation packet is addressed to the second wireless device 20 itself on the basis of the information indicating the destination.

Through the operations described above, it is possible to extend the length of Trx that is an intermittent cycle to be longer than Lpr that is a time during which the preamble is continuously transmitted (preamble length) in the wireless communication system 100 according to the first embodiment. It is thus possible to secure the sleep time of the second wireless device 20 over a longer time. Accordingly, it is possible to further reduce power consumption in the wireless communication device that performs intermittent operations.

As described above, the first wireless device 10 repeatedly transmits the activation packet (activation signal) until the response packet is received in the wireless communication system 100. Through such an operation, it is possible to reliably and efficiently activate the second wireless device 20 that performs intermittent operations. Hereinafter, principles of such an operation will be described.

Figure 5:
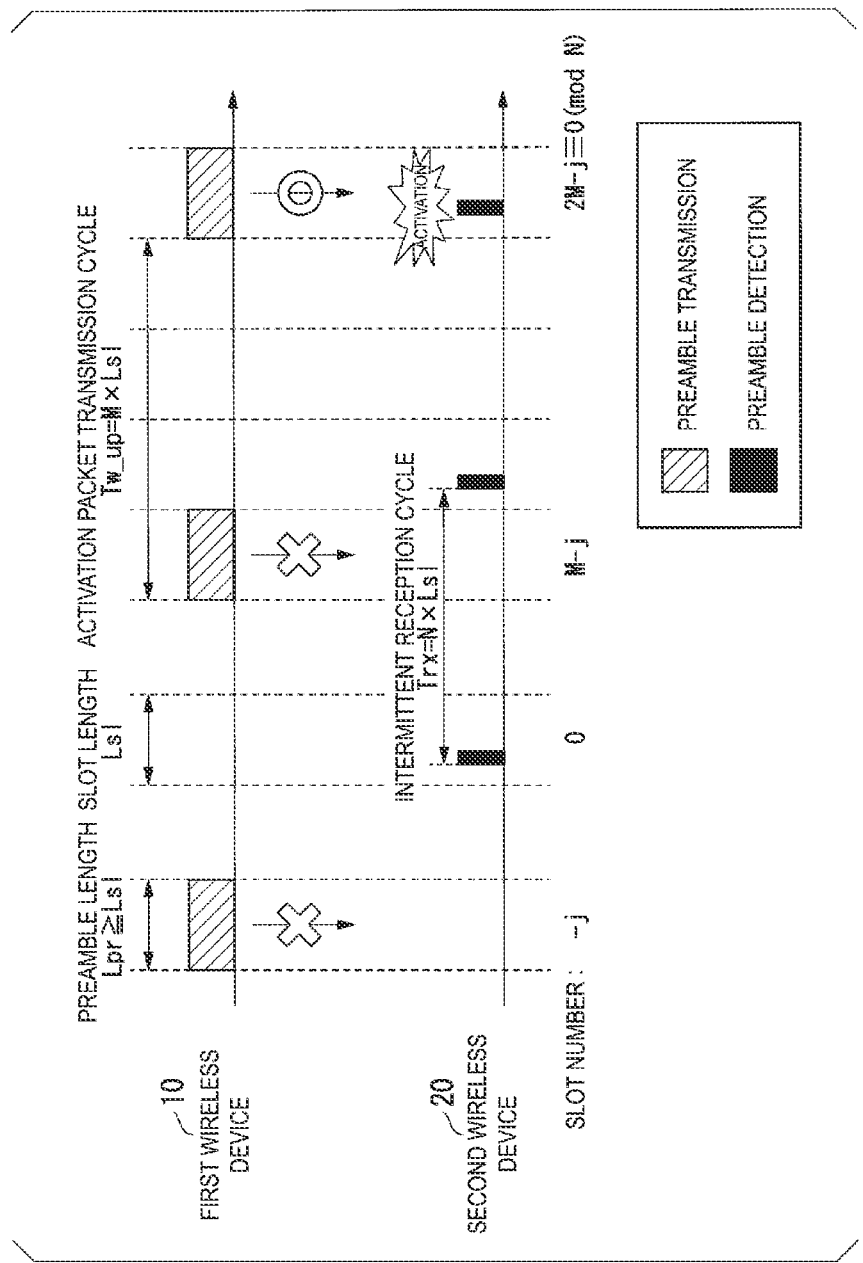
FIG. 5 is a time chart illustrating only operations related to activation in an extracted manner.

FIG. 5 is a time chart illustrating only operations related to activation in an extracted manner. The operations related to activation specifically include preamble transmission and preamble detection. Note that although any length that is equal to or longer than Lsl can be used as the length Lpr of the preamble added to the activation packet, Lpr=Lsl will be defined in the following description for convenience, and the time is divided into slot units of the length Lsl. The slot number of a slot including a timing at which the second wireless device 20 first performs the preamble detection will be defined as "0". The offset j represents the number of slots between the slot in which the first wireless device 10 transmits a preamble of an activation packet for the first time and the slot with the slot number "0" (offset). The slot number of the slot in which the first wireless device 10 transmits the preamble of the activation packet for the first time will thus be defined as "−j."

In a case in which the timing of the slot in which the first wireless device 10 transmits the preamble coincides with the timing of the slot in which the second wireless device 20 detects the preamble, the second wireless device 20 is activated. Thus, the second wireless device 20 is activated by n-th transmission of the activation packet that satisfies the following expression.

[Math. 1]
$$(n-1)*M - j \equiv 0 \pmod{N} \tag{1}$$

For example, M=4, N=3, and j=2 in the example in FIG. 5. The second wireless device 20 is thus activated by the third transmission of the activation packet. M and N are mutually prime any integers, and the first wireless device 10 and the second wireless device 20 operate mutually independently. Thus, j can be any value between 0 to M−1. Hereinafter, the fact that n that satisfies Expression (1) with any M, N, and j exists will be described.

It is known that when M and N are mutually prime integers, remainders of dividing {0, N, 2N, 3N, . . . , (M−1)×N} by M respectively take all different values from 0 to M−1 according to a basic theorem of a complete residue system. Similarly, remainders of dividing {−j, N−j, 2N−j, 3N−j, . . . (M−1)×N−j} by M take also all different values from 0 to M−1 according to the nature of residues. This means that there are numbers that are always exactly divisible by N in (n−1)×M−j, and n that is equal to or less than N that satisfies Equation (1) always exists. It is thus possible to reliably achieve activation in any circumstances.

As described above, it is possible to set the intermittent reception cycle as a longer cycle than the longest transmission time limited by the restriction in implementation of the wireless device and the radio law by performing the transmission and the preamble detection at cycles defined on the basis of M and N with a relationship that M and N are mutually prime integers, using the activation signal with a shorter preamble length in the wireless communication system 100 according to this embodiment. It is possible, with such setting, to reliably activate the second wireless device 20 through processing requiring low power consumption and to perform wireless communication.

Also, as described below, when compared with the related art that operates with the same intermittent reception cycle, power consumption required for activation is reduced and penalty of power consumption in a case in which the wireless device is erroneously activated with an activation packet that is not addressed to the wireless device itself is reduced.

First, an effect of reducing power consumption required for activation will be described. In this embodiment, the number of times the activation packet is transmitted is (1+N)/2 on average, and a total length of preambles transmitted is Lsl×(1+N)/2. Thus, the total length of preambles is approximately a half of the intermittent reception cycle in a case in which N is sufficiently large. It can be understood from comparison with the related art in which transmission of preambles with the length of equal to or longer than the intermittent reception cycle is always needed that the power required to transmit the preambles can be reduced to approximately ½ in this embodiment.

Next, the effect of reducing penalty of power consumption at the time of erroneous activation will be described. In this embodiment, a case in which a wireless device is erroneously activated with an activation packet that is not addressed to the wireless device itself corresponds to a case in which the second wireless device 20, which is the original destination, is activated earlier than it should. The probability is approximately ½. In addition, it is only necessary to receive a preamble once, which corresponds to 1/N times the number of times of reception in the related art, even in a case in which the wireless device has been erroneously activated. It is thus possible to understand that the penalty of power consumption at the time of erroneous activation can be reduced to approximately ½N as compared with the related art in which there is always a possibility of erroneous activation and it is necessary to receive all long preamble signals.

Second Embodiment

Figure 6:
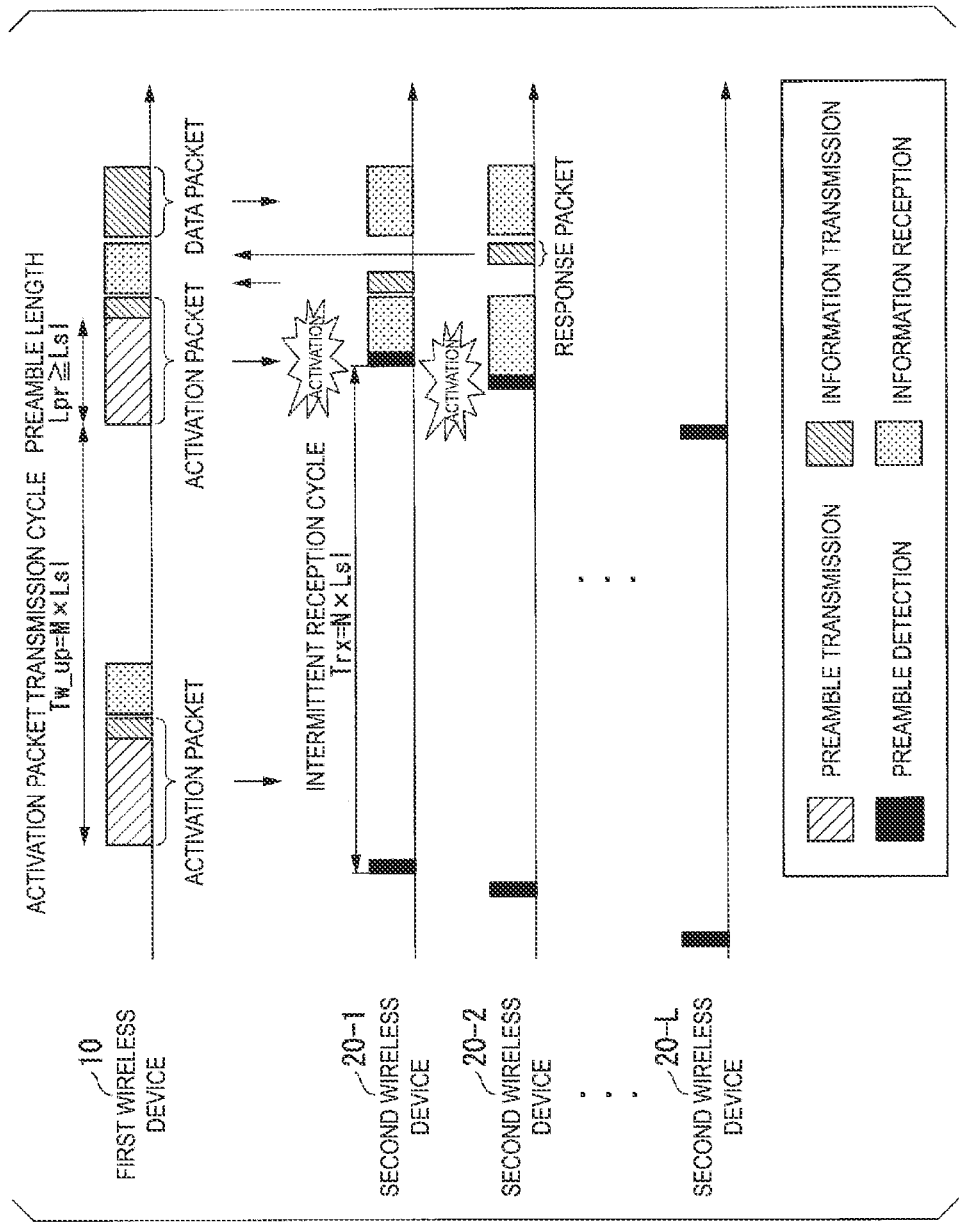
FIG. 6 is a diagram illustrating a specific example of wireless communication performed between a first wireless device 10 and a plurality of second wireless devices 20 according to a second embodiment.

FIG. 6 is a diagram illustrating a specific example of wireless communication performed between a first wireless device 10 and a plurality of second wireless devices 20 according to the second embodiment. In the second embodiment, the first wireless device 10 activates at least one of the plurality of second wireless devices 20 (20-1 to 20-L) configured to perform intermittent operations and transmits data to any of the second wireless devices 20.

First, a communication control unit 13 of the first wireless device 10 transmits an activation packet to which a preamble with a length of equal to or longer than Lsl has been added at a cycle of M×Lsl. Once the activation packet is transmitted, the communication control unit 13 then waits for a response packet over a predetermined time. In a case in which the response packet is not received while the response packet is waited for, the communication control unit 13 repeatedly transmits the activation packet in accordance with an activation signal transmission cycle. Note that the information indicating the timing at which the first wireless device 10 waits for the response packet may be included in the activation packet and may be provided as a notification to the second wireless device 20. The information indicating the timing at which the first wireless device 10 waits for the response packet may be stored or set in advance by the second wireless device 20.

A communication control unit 23 of each second wireless device 20 intermittently executes preamble detection processing at a cycle of N×Lsl, respectively. If the preamble is being transmitted from the first wireless device 10 at the timing of the preamble detection processing, the communication control unit 23 detects the preamble. Once the preamble is detected, the communication control unit 23 activates the second wireless device 20 and continues reception processing until a predetermined timing. The predetermined timing may be, for example, a timing until reception of the activation packet is completed or during a predefined time.

Thereafter, the communication control unit 23 of each second wireless device 20 determines whether the received activation packet is addressed to the second wireless device 20 itself. In a case in which the received activation packet is addressed to the second wireless device 20 itself, the communication control unit 23 transmits the response packet to the first wireless device 10. At this time, the communication control unit 23 transmits the response packet at a random timing within a waiting time of the first wireless device 10. For example, the communication control unit 23 may transmit the response packet with a random time delay within the waiting time of the first wireless device 10.

Once the response packet is received, the communication control unit 13 of the first wireless device 10 transmits a data packet to any of the plurality of second wireless devices 20. At this time, the communication control unit 13 may temporarily stop the transmission of the activation packet after receiving the response packet.

In the specific example illustrated in FIG. 6, the activation packet is transmitted to a broadcast address, and the second wireless device 20-1 and the second wireless device 20-2 are activated by the second transmission of the activation packet. Each of the second wireless device 20-1 and the second wireless device 20-2 transmits a response packet.

Thereafter, the first wireless device 10 transmits the data packet to the second wireless device 20-1.

By randomly determining the reply timing of the response packet, it is possible to avoid congestion of the response packet even in a case in which a plurality of second wireless devices 20 are activated by the same activation packet. This enables the first wireless device 10 to more reliably transmit the data packet even in an environment in which a plurality of second wireless devices 20 are present.

Also, a configuration in which a back-off value is randomly determined in a case in which congestion (collision) occurs in returning of the response packet may also be employed. With such a configuration, it is possible to reduce the possibility of congestion occurring again in the following retransmission even in a case in which congestion occurs.

Third Embodiment

Figure 7:
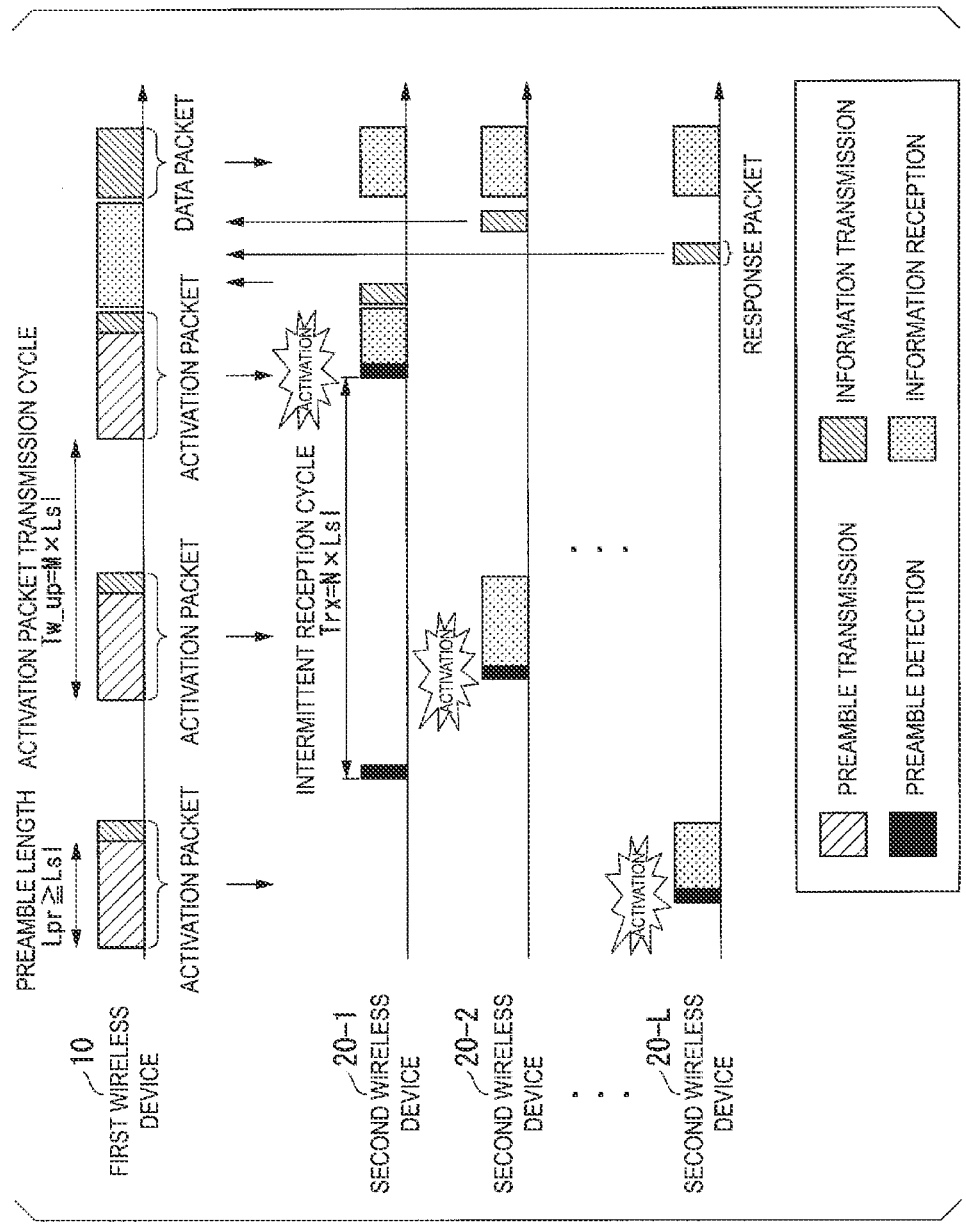
FIG. 7 is a diagram illustrating a specific example of wireless communication performed between a first wireless device 10 and a plurality of second wireless devices 20 according to a third embodiment.
Figure 8:
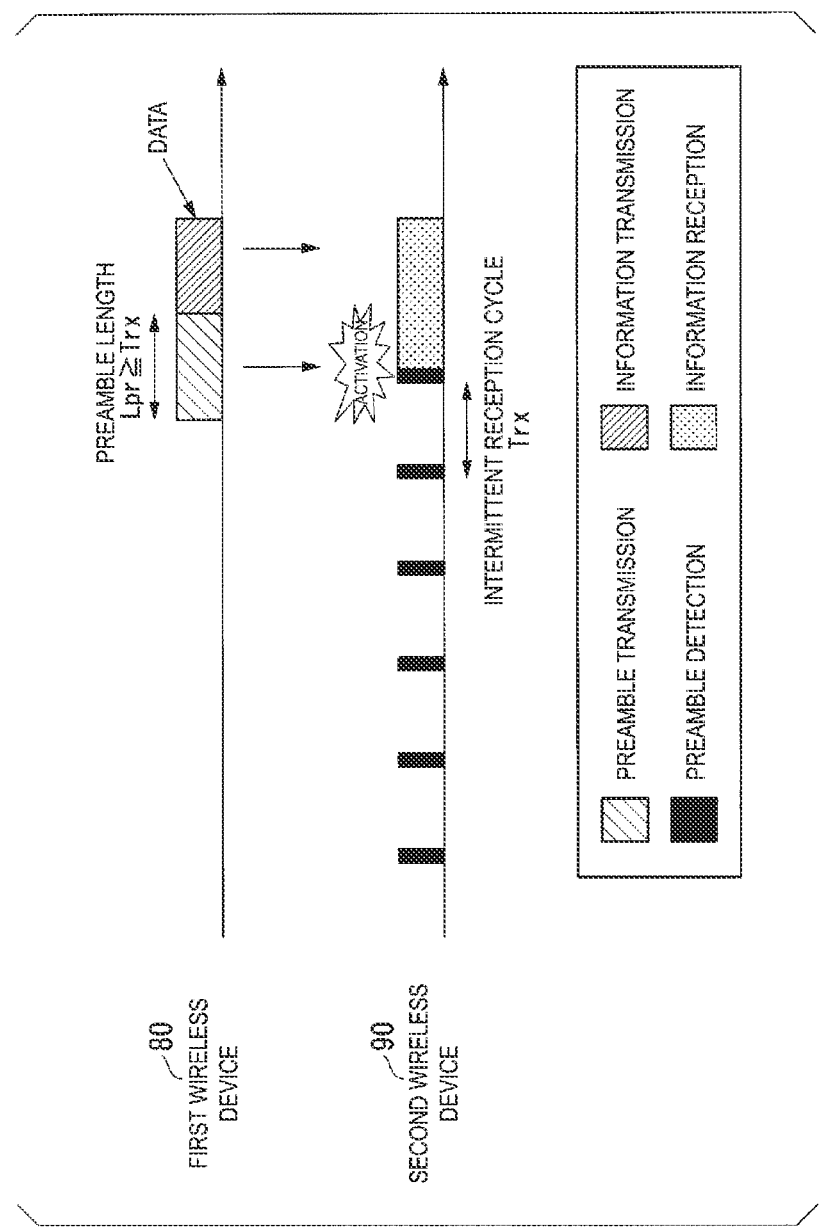
FIG. 8 is a time chart illustrating an operation example of wireless communication performed between a first wireless device 80 and a second wireless device 90 disclosed in Non Patent Literature 1.

FIG. 7 is a diagram illustrating a specific example of wireless communication performed between a first wireless device 10 and a plurality of second wireless devices 20 according to the third embodiment. In the third embodiment, the first wireless device 10 activates all the plurality of second wireless devices 20 (20-1 to 20-L) configured to perform intermittent operations and transmits data to any of the second wireless devices 20.

First, a communication control unit 13 of the first wireless device 10 transmits an activation packet to which a preamble with a length of equal to or longer than Lsl has been added, N times at a cycle of M×Lsl. Once the activation packet is transmitted, the communication control unit 13 then waits for a response packet over a predetermined time. In a case in which the response packet is not received while the response packet is waited for, the communication control unit 13 repeatedly transmits the activation packet in accordance with an activation signal transmission cycle. Note that the information indicating the timing at which the first wireless device 10 waits for the response packet may be included in the activation packet and may be provided as a notification to the second wireless device 20. The information indicating the timing at which the first wireless device 10 waits for the response packet may be stored or set in advance by the second wireless device 20.

A communication control unit 23 of each second wireless device 20 intermittently executes preamble detection processing at a cycle of N×Lsl, respectively. If the preamble is being transmitted from the first wireless device 10 at the timing of the preamble detection processing, the communication control unit 23 detects the preamble. Once the preamble is detected, the communication control unit 23 activates the second wireless device 20 and continues reception processing until a predetermined timing. The predetermined timing may be, for example, a timing until reception of the activation packet is completed or during a predefined time.

Thereafter, the communication control unit 23 of each second wireless device 20 determines whether the received activation packet is addressed to the second wireless device 20 itself. In a case in which the received activation packet is addressed to the second wireless device 20 itself, the communication control unit 23 transmits the response packet at a random timing within the waiting time of the first wireless device 10. For example, the communication control unit 23 may transmit the response packet with a random time delay within the waiting time of the first wireless device 10.

The communication control unit 13 of the first wireless device 10 that has received the response packet transmits a data packet to any of the plurality of second wireless devices 20 (20-1 to 20-L).

In the third embodiment, transmission and reception of the response packet are executed after the activation packet is transmitted N times. It is thus possible to activate all the communicable second wireless devices 20. This enables the wireless device 31 to transmit the data packet to the appropriate second wireless device 20 among all the communicable second wireless devices 20 while knowing the communicable second wireless devices 20.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure can be applied to a technology of performing wireless communication through intermittent operations.

REFERENCE SIGNS LIST

10 First wireless device
20 Second wireless device
11 Wireless communication unit
12 Storage unit
13 Communication control unit
21 Wireless communication unit
22 Storage unit
23 Communication control unit

The invention claimed is:

1. A wireless communication system in which a first wireless device and a second wireless device intermittently perform wireless communication,
    wherein the first wireless device repeatedly transmits an activation signal for activating the second wireless device at a first cycle until receiving a response signal from the second wireless device, and transmits, when the response signal is received, data to the second wireless device, and
        the second wireless device repeatedly executes detection processing of the activation signal at a second cycle that is longer than the first cycle, receives, when a part of the activation signal is detected in the detection processing, the activation signal, transmits, when the activation signal is addressed to the second wireless device itself, the response signal to the first wireless device, and then receives the data from the first wireless device,
    wherein when the second cycle is represented as Trx and two mutually prime integers are represented as M and N,
        the first wireless device adds a preamble with a length of equal to or longer than 1/N times the length of Trx to the activation signal, and
        the first cycle is a value of M/N times the value of Trx.

2. The wireless communication system according to claim 1, wherein the first wireless device waits for the response signal over a predetermined time after transmitting the activation signal.

3. The wireless communication system according to claim 2, wherein the second wireless device transmits, when transmitting the response signal, the response signal at a random timing within a predetermined time during which the first wireless device waits for the response signal.

4. The wireless communication system according to claim 1, wherein the first wireless device waits for the response signal over a predetermined time after transmitting the activation signal a plurality of times.

5. A second wireless device in a wireless communication system in which a first wireless device and the second wireless device intermittently perform wireless communication,
    wherein the first wireless device comprises a communication control unit, including one or more processors, configured to repeatedly transmit an activation signal for activating the second wireless device at a first cycle until receiving a response signal from the second wireless device, and transmits, when the response signal is received, data to the second wireless device, and
    the second wireless device comprises a communication control unit, including one or more processors, configured to repeatedly execute detection processing of the activation signal at a second cycle that is longer than the first cycle, receive, when a part of the activation signal is detected in the detection processing, the activation signal, transmit, when the activation signal is addressed to the second wireless device itself, the response signal to the first wireless device, and then receive the data from the first wireless device, and
    wherein when the second cycle is represented as Trx and two mutually prime integers are represented as M and N,
        the first wireless device adds a preamble with a length of equal to or longer than 1/N times the length of Trx to the activation signal, and
        the first cycle is a value of M/N times the value of Trx.

6. The second wireless device according to claim 5, wherein the first wireless device waits for the response signal over a predetermined time after transmitting the activation signal.

7. The second wireless device according to claim 6, wherein the second wireless device transmits, when transmitting the response signal, the response signal at a random timing within a predetermined time during which the first wireless device waits for the response signal.

8. The second wireless device according to claim 5, wherein the first wireless device waits for the response signal over a predetermined time after transmitting the activation signal a plurality of times.

9. A method of wireless communication performed by a wireless communication system in which a first wireless device and a second wireless device intermittently perform wireless communication, the method comprising:
    by the first wireless device, repeatedly transmitting an activation signal for activating the second wireless device at a first cycle;
    by the second wireless device, repeatedly executing detection processing of the activation signal at a second cycle that is longer than the first cycle, receiving, when a part of the activation signal is detected in the detection processing, the activation signal, and transmitting, when the activation signal is addressed to the second wireless device itself, a response signal to the first wireless device;
    upon receiving by the first wireless device the response signal from the second wireless device, stopping the repeated transmitting of the activation signal and transmitting data to the second wireless device; and by the second wireless device, receiving, after transmitting the response signal, the data from the first wireless device, wherein when the second cycle is represented as Trx and two mutually prime integers are represented as M and N, the first wireless device adds a preamble with a length of equal to or longer than 1/N times the length of Trx to the activation signal, and the first cycle is a value of M/N times the value of Trx.

10. The method of wireless communication according to claim 9, wherein the first wireless device waits for the response signal over a predetermined time after transmitting the activation signal.

11. The method of wireless communication according to claim 10, wherein the second wireless device transmits, when transmitting the response signal, the response signal at a random timing within a predetermined time during which the first wireless device waits for the response signal.

12. The method of wireless communication according to claim 9, wherein the first wireless device waits for the response signal over a predetermined time after transmitting the activation signal a plurality of times.

* * * * *